United States Patent [19]

Hori et al.

[11] Patent Number: 4,960,738
[45] Date of Patent: Oct. 2, 1990

[54] MULLITE-ALUMINA COMPOSITE SINTERED BODY AND PROCESS FOR PRODUCING THE SAME

[75] Inventors: Saburo Hori, Tokyo; Ryuichi Kurita, Iwaki, both of Japan

[73] Assignee: Kureha Chemical Industry Co., Ltd., Tokyo, Japan

[21] Appl. No.: 262,305

[22] Filed: Oct. 25, 1988

[30] Foreign Application Priority Data

Nov. 2, 1987 [JP] Japan .................................. 62-277800

[51] Int. Cl.$^5$ ............................................. C04B 35/00
[52] U.S. Cl. ........................................ 501/128; 501/5; 501/127; 423/328
[58] Field of Search ....................... 427/166, 167, 168; 264/11, 12, 65; 423/327, 328; 501/5, 128, 153, 154

[56] References Cited

U.S. PATENT DOCUMENTS

| | | | |
|---|---|---|---|
| 3,857,923 | 12/1974 | Gardner et al. ...................... | 423/327 |
| 4,272,500 | 6/1981 | Eggerding et al. .................. | 423/327 |
| 4,418,024 | 11/1983 | Prochzka et al. ..................... | 264/1.2 |
| 4,418,025 | 11/1983 | Prochazka et al. .................. | 264/1.2 |
| 4,640,904 | 2/1987 | Hillig et al. .......................... | 501/128 |
| 4,774,068 | 9/1988 | Hiraiwa et al. ....................... | 423/327 |

OTHER PUBLICATIONS

Gani et al. "Glass Formation & Phase Transformations in Plasma Prepared Al$_2$O$_3$—SiO$_2$Powders" *Journal of Natl. Sci.* vol. 12 pp. 999-1009 (1977).
Kanzaki et al, "Dependency of Mechanical Property of Sintered Mullite on Chemical; Compositions", *Yogyo-Kyokai-shi*, vol. 93, No. 7, pp. 407-408 (1985).
Somiya, "Mullite", Uchida Rokakuho, pp. 51-61 (1985).
Ismail et al, "Microstructure and Mechanical Properties of Mullite Prepared by the Sol-Gel Method", *J. Am. Ceram. Soc.*, vol. 70, No. 1, C-7-C-9 (1987).
Gardner et al, U.S. Pat. No. 3,857,923, "Mullite Package for Integrated Circuit Devices", Dec. 31, 1974.
Gani et al "Glass Formation and Phase Transformations in Plasma Prepared Al$_2$O$_3$—SiO$_2$ Powders", *Journal of Materials Science*, vol. 12, pp. 999-1009 (1977).
Debely et al, "Preparation and Sintering Behavior of Fine-Grained Al$_2$O$_3$—SiO$_2$ Composite", *J. Am. Ceram. Soc.*, vol. 68, No. 3, C-76-C-78, (1985).
Okada et al, "Formation Reaction of Mullite from SiO$_2$—Al$_2$O$_3$ Xerogels", *Journal of Materials Science Letters*, vol. 5, pp. 13-15-1318 (1986).
Cameron, "Composition and Cell Dimensions of Mullite", *Ceramic Bulletin*, vol. 56, No. 11, pp. 1003-1011 (1977).

*Primary Examiner*—William R. Dixon, Jr.
*Assistant Examiner*—Chris Gallo
*Attorney, Agent, or Firm*—Lowe, Price, Leblanc, Becker & Shur

[57] ABSTRACT

A mullite-alumina composite sintered body composed of from 75 wt % to 85 wt % Al$_2$O$_3$ balance SiO$_2$, consisting of two crystalline phases, mullite and α-phase alumina, and being free from glass phase, wherein both of the average diameters of mullite grains and α-phase alumina grains are not more than 1.0 μm, the content of grains having the longitudinal-length of not less than 2.5 μm is 1% or less in the observation of a cross section of said sintered body, and the porosity of said sintered body is 1% or less.

The sintered body of the present invention is produced by a process comprising the steps of preparing a starting powdery material composed of from 75 wt % to 85 wt % Al$_2$O$_3$ balance SiO$_2$ and containing amorphous phase from 65 wt % to 90 wt %, wherein each particle of said starting powdery material contains both Al$_2$O$_3$ and SiO$_2$, and sintering said starting powdery material at a temperature in the range from 1500° C. to 1650° C.

The sintered body of the present invention has a high bending strength exceeding 500 MPa at room temperature.

7 Claims, 4 Drawing Sheets (× 33000)

( x 5000 )

MULLITE-ALUMINA COMPOSITE SINTERED BODY AND PROCESS FOR PRODUCING THE SAME

BACKGROUND OF THE INVENTION

1. Field of the Invention

This invention relates to a mullite-alumina composite sintered body having high mechanical strength and heat-resisting property, and a process for producing the same. This invention provides a ceramic material suitably usable as a material for various furnaces or a heat-resisting structural material etc. which requires mechanical strength at a high temperature as well as at room temperature.

2. Description of the Prior Art

Mullite is a compound, having a molar ratio of alumina ($Al_2O_3$) to silica ($SiO_2$) of 3:2, has been known as oxide ceramics having high mechanical strength at a high temperature and is attracting attention as a structural material having heat and oxidation resistance.

It is necessary to employ a chemically processed high purity powder as the starting material so as to obtain high performance mullite ceramics. Starting powdery materials for producing such high performance mullite ceramics can be divided into two categories.

The starting powdery materials for mullite of the first category are produced by preparing mullite precursor, mullitizing the mullite precursor by calcination and then grinding the mullitized powder. Such mullite precursor is prepared from high purity alumina, an aluminum salt or boehmite (aluminum hydroxide) and a silicon compound or colloidal silica. In the mullite precursor, hydroxide or oxide of aluminum and hydroxide or oxide of silicon are homogeneously mixed. The above starting powdery materials for mullite have high purity and fine-grained structures.

The starting powdery materials for mullite of the second category are particles formed of a composite or a homogeneous mixture of alumina (or its precursor) and silica (or its precursor). The particles comprise amorphous phase or a mixture of alumina crystal phase and amorphous phase, being substantially free from mullite phase. Such starting powdery materials can also be employed as the precursor of mullitized powder in the first category.

Phase transformations do not occur during sintering in the preparation methods employing the first category materials, while they occur in the preparation methods employing the second category materials. Therefore, there is a possibility of a great difference in sintering behavior and microstructures, depending upon which category of materials is employed.

Among the methods using mullitized powder in the first category, there are some reports by Kanzaki et al. in which mullite powder is prepared by the process comprising spray pyrolysis of the solution of $Al(NO_3)_3$ and $Si(OC_2H_5)_4$, calcination and thereafter grinding of the mullitized powder (Yogyo-Kyokai-Shi 93 [7]407–408 (1985), and "Mullite" edited by Somiya, published by Uchida Rokakuho pp. 51–61 (1985). The room temperature bending strength of a sintered mullite body produced by pressureless sintering in the above report does not so much vary with the composition of mullite. The value of the bending strength in the case of sintering at the temperature of 1650° C. for 4 hours is from 320 to 380 MPa and the sintered density is only about 95% of the theoretical density, and therefore the enhancement of the density might be necessary to improve the bending strength. In fact, in the case of sintering by a hot-pressing method, the high bending strength of 500 MPa could be achieved at the stoichiometric mullite composition (containing 71.8 wt % $Al_2O_3$). But there has been no report concerning the hot-pressing of mullite containing excessive $Al_2O_3$, which is relatively difficult to sinter.

Ismail et al. produced a sintered body having the room temperature bending strength of 405 MPa (J. Am. Ceram. Soc., 70 [1] C-7~C-8 (1987), Japanese Patent Appln. Laid-Open No. 61/281013). Such a sintered body is produced by calcining the mixture of boehmite and colloidal silica at the temperature of 1400° C., grinding it to obtain stoichiometric mullite powder and then shaping the powder and sintering it at the temperature of 1650° C. to densify to a relative density from 98.9 to 99.5%.

Hiraiwa et al. achieved the densification up to 99% of the theoretical density by preparing a precipitate from an aluminum salt and colloidal silica, heat-treating the precipitate to form mullite powder and sintering this mullite powder at 1550° C. (Japanese Patent Appln. Laid-Open No. 62/17005).

Hirano et al. obtained high strength mullite and mullite-alumina composite sintered bodies by the method, which employs sodium silicate and an aluminum salt as starting materials, prepares mullite powder having the $Al_2O_3/SiO_2$ weight ratio of from 65/35 to 80/20 by heating and grinding, and sinters this mullite powder at 1600° C. for 2 hours (Japanese Patent Appln. Laid-Open No. 62/56356). With respect to the stoichiometric mullite composition of 72/28 by the $Al_2O_3/SiO_2$ weight ratio, the room temperature bending strength of 43 kg/mm$^2$ (421 MPa) and the sintered density of 99.7% (as to the theoretical density of 3.17 g/cm$^3$) was achieved. With respect to the mullite-alumina composite composition of 78/22 by the $Al_2O_3/SiO_2$ weight ratio, the room temperature bending strength of 45 kg/mm$^2$ (441 MPa) was achieved, but the sintered density was still as low as 96% (as to the theoretical density of 3.27 g/mm$^3$).

If the high density can be attained in the composition range containing excessive alumina relative to the stoichiometric mullite composition, the higher strength can be expected. But the high density was difficult to achieve by the above method employing the mullitized powder as a starting material.

Concerning the methods employing powders of the second category which hardly contain mullite phase, first Gardner et al. reported that a density higher than 99% of the theoretical density could be achieved by the method of shaping a compound of $3Al_2O_3+2SiO_2$ obtained by flame pyrolysis of a solution of $6AlCl_3+2SiCl_4$ and sintering it at a temperature from 1500° C. to 1600° C. (U.S. Pat. No. 3,857,923, Japanese Patent Appln. Laid-Open No. 49/52200). But the mechanical properties have not been reported, and the variation by the composition has not been referred to, either.

Gani et al. prepared $Al_2O_3$-$SiO_2$ composite powder of various compositions by oxidation of gaseous mixtures of $Al_2Br_6$ and $SiCl_4$ in r.f. plasma, and discussed the properties of the composite powder, especially crystalline phases (J. Mater. Sci., 12 (1977) 999–1009). But they have not referred to the sinterability of the powder nor the properties of mullite obtained by sintering the powder.

Prochazka et al. have shown that optically translucent mullite could be produced by a process comprising the steps of calcining an amorphous oxide mixture, which consisted of from 74 wt % to 76.5 wt % $Al_2O_3$ balance $SiO_2$ with a surface area ranging from 100 to 400 $m^2$/g, at a temperature from 490° to 1000° C., preferably at a temperature from 500° to 700° C., thereafter subjecting a calcined compact to the primary sintering at a temperature from 1500° C. to 1675° C. in oxygen or in vacuum, and further sintering it at a temperature from 1700° C. to 1850° C. (U.S. Pat. No. 4,418,024, 4,418,025). With respect to the sintered compact produced by the primary sintering, it is described that said sintered compact was gas-impermeable, and there is no description concerning density, microstructure nor strength.

Debély et al. have shown that the densification al a temperature lower than in the previous methods could be attained by the method comprising the steps of preparing separately a slurry of commercial alumina having an average diameter of 0.29 μm and a slurry of colloidal silica having an average diameter of 0.02 μm, introducing the alumina slurry little by little into the silica slurry to cover the alumina particles with silica, taking out the alumina particles covered with silica by a centrifuge, pressing and sintering (J. Am. Ceram. Soc., 68 [3] C-76~C-78 (1985)). They have shown that the densification to 98% of the theoretical density could be attained by sintering at 1400° C. for 1 hour. The composite powder having the composition of 80 wt % $Al_2O_3$ and 20 wt % $SiO_2$ reached full (100%) density by sintering at 1550° C. for 1 hour, and the sintered body comprising mullite and alumina having the sintered grain size of about 0.5 μm was obtained. Debély et al. have not reported the mechanical properties of the sintered body. In this report, it was described that the chemical reaction for mullite formation began at 1490° C. Therefore, it is assumed that the strength of the sintered body is not so high, since unreacted glass phase of silica remains along grain boudaries, while the sintering proceeds at a low temperature because of the existence of glass phase of silica.

Kawado obtained a sintered body densified to 99% of the theoretical density by the method which comprised employing alumina produced by a vapor-phase reaction and alkoxide of silica as starting materials, shaping after gelation, and sintering the shaped body. But the room temperature strength was still as low as 280 MPa (Japanese Patent Appln. Laid-Open No. 62/46955, No. 62/46956).

The above prior arts may be summarized as follows:

In the case of producing sintered bodies from mullitized powder, the densification is difficult because of the poor sinterability of mullite. Especially, at a composition containing excessive alumina relative to the stoichiometric mullite composition, the densification is more difficult since remaining glass phase of silica is not present. From the report by Hirano et al. (Japanese Patent Appln. Laid-Open No. 62/56356), if the high density is attained without causing much grain-growth, high strength is expected with respect to the mullite-alumina composite sintered body having the composition of about 78 wt % $Al_2O_3$ and about 22 wt % $SiO_2$. But it has not been possible by the prior arts.

On the other hand, in the case of producing sintered bodies from the powder which hardly contains mullite, it is possible that the sintering proceeds at a low temperature, mainly because of the existence of glass phase of silica. But the chemical reaction to form mullite from this glass phase of silica and alumina is difficult to occur. Especially in the case large alumina particles are used, the strength is not high, because the reaction is never completed and a large amount of the glass phase remains.

SUMMARY OF THE INVENTION

The maximum value of the bending strength of mullite ceramics reported hitherto is about 45 kg/$mm^2$ (441 MPa) with respect to the sintered body produced by pressureless sintering, or about 51 kg/$mm^2$ (500 MPa) with respect to the sintered body produced by hot pressing. The properties required for the heat-resisting structural material is not only the high strength at a high temperature, but also the high strength at room temperature, in consideration of the thermal-stress caused by heating and cooling. Therefore, it is important to improve the room temperature strength, which has been more than 51 kg/$mm^2$ (500 MPa).

The present invention has been accomplished for overcoming such problem and providing mullite ceramics having a high strength, especially at room temperature.

It has been found that it is necessary to satisfy the following three requirements so as to improve the room temperature strength of mullite ceramics.
(1) to make the density as high as possible, namely to make the porosity as small as possible,
(2) to eliminate the glass phase, and
(3) to make the sintered grain size small and uniform.

The mullite-alumina composite sintered body according to the present invention satisfies these three requirements.

The present invention features a mullite-alumina composite sintered body composed of from 75 wt % to 85 wt % $Al_2O_3$ balance $SiO_2$, consisting of two crystalline phases, mullite and α-phase alumina, and being free from glass phase, wherein both of the average diameters of mullite grains and α-phase alumina grains are not more than 1.0 μm, the content of grains having the longitudinal-length of not less than 2.5 μm is 1% or less in the observation of a cross section of said sintered body, and the porosity of said sintered body is 1% or less.

Such a sintered body can be produced by the following method.

The present invention further features a process for producing a mullite-alumina composite sintered body, comprising the steps of
preparing a starting powdery material composed of from 75 wt % to 85 wt % $Al_2O_3$ balance $SiO_2$ and containing amorphous phase from 65 wt % to 90 wt %, wherein each particle of said starting powdery material contains both $Al_2O_3$ and $SiO_2$,
and sintering said starting powdery material at a temperature in the range from 1500° C. to 1650° C.

DETAILED DESCRIPTION OF THE INVENTION

Figure 1:
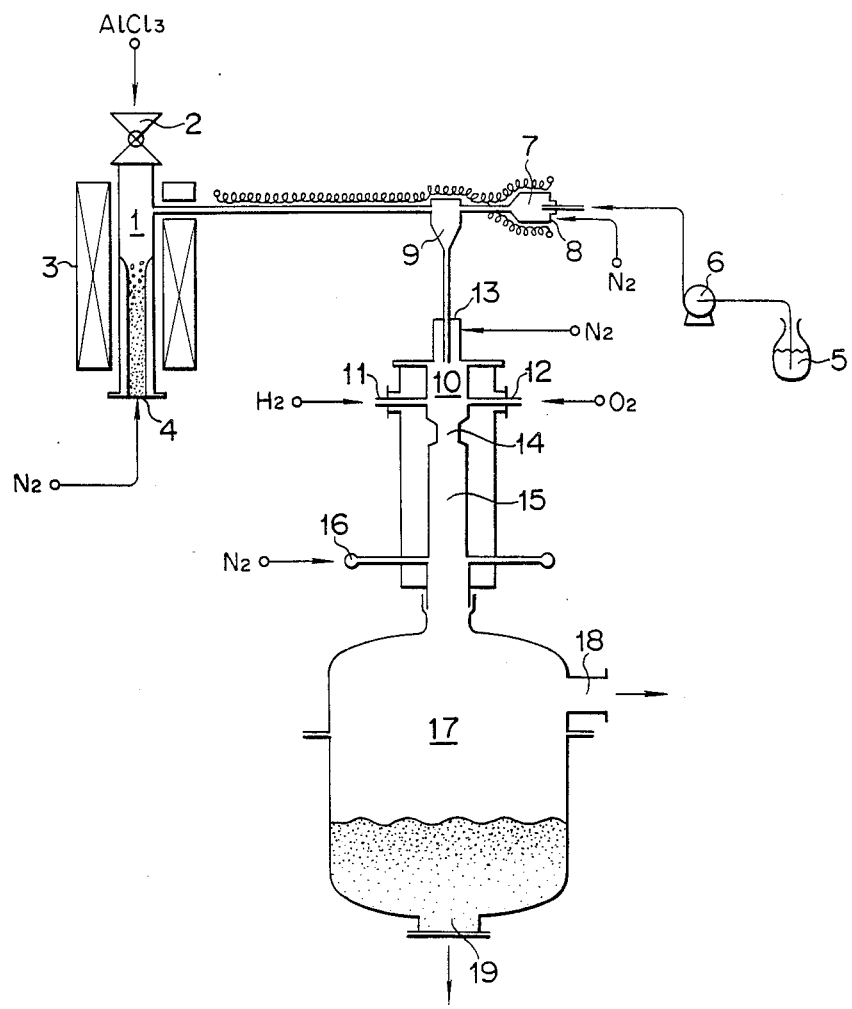
FIG. 1 is a schematic view illustrating the process and the apparatus for preparing a starting powdery material according to Example 1.

The mullite-alumina composite sintered body according to the present invention is in the compositional range from 75 wt % to 85 wt % $Al_2O_3$ balance $SiO_2$. If the content of $Al_2O_3$ is less than 75 wt %, the glass phase caused by unreacted silica remains to lead to deterioration of the strength or non-uniform grain-growth, and if the content of $Al_2O_3$ is more than 85 wt %, the strength at a high temperature is remarkably lowered. The more preferable composition range of $Al_2O_3$ is from 77 wt % to 83 wt % in view of the room temperature strength and the high temperature strength.

Mullite of the stable state has the composition ranging from the $Al_2O_3/SiO_2$ molar ratio of 3/2 to the ratio slightly larger than 3/2, namely the range from 71.8 wt % to 74 wt % $Al_2O_3$.

It has been reported concerning that mullite metastably containing $Al_2O_3$ more than 74 wt % (62.6 mol %) could be obtained by direct crystallization from an amorphous state (for example Okada et al., J. Mater. Sci. Letters 5 (1986) 1315).

During sintering of the starting powdery material of the amorphous state, a metastable mullite, whose molar ratio of $Al_2O_3/SiO_2$ is larger than that of a stable mullite, forms first and gradually changes to a stable mullite by separating alumina, and thus a mullite-alumina composite sintered body is formed. The sintered body of the present invention is produced by utilizing the above phenomenon, and in the Examples of the present invention, the $Al_2O_3/SiO_2$ molar ratio of the metastable mullite containing excessive $Al_2O_3$ was from about 2/1 to about 3/1.

Further, the sintered body of the present invention consists of two crystalline phases, mullite and α-phase alumina, being free from glass phase, wherein both of the average diameters of mullite grains and alumina grains are not more than 1.0 μm and in the observation of a cross section of the sintered body, the content of grains having the longitudinal-length of not less than 2.5 μm is 1% or less. The sintered body of the present invention has a smaller sintered grain size than the mullite or a mullite-alumina sintered bodies previously reported, and its porosity is 1% or less.

A mullite-alumina composite sintered body possessing all above features has not existed hitherto, and it has been found that such a mullite-alumina composite sintered body has the room temperature bending strength exceeding 500 MPa which could not be achieved with the mullite or mullite-alumina sintered bodies previously reported.

In the method for producing a mullite-alumina composite sintered body of the present invention, the first step is to prepare a starting powdery material composed of from 75 wt % to 85 wt % $Al_2O_3$ balance $SiO_2$ and containing an amorphous phase from 65 wt % to 90 wt % which is determined by X-ray diffraction data, wherein each particle of said starting powdery material contains both of $Al_2O_3$ and $SiO_2$.

A metastable ($Al_2O_3$-rich) mullite having the $Al_2O_3/SiO_2$ molar ratio of larger than that of a stable mullite (namely containing $Al_2O_3$ not less than 75 wt %) forms at a temperature ranging from 900° C. to 1000° C. by firing the mostly amorphous material shown above. Such metastable mullite starts to separate alumina at a temperature higher than about 1000° C. and completes the separation of alumina at about 1400° C. to form mullite of the stable state (containing $Al_2O_3$ from 71.8 wt % to 74 wt %). As the result, the sintered body comprising mullite and alumina can be obtained. It seems that the alumina separated from the metastable mullite is reactive alumina of γ-phase, δ-phase or θ-phase.

The mullite existing at a temperature from about 1000° C. to about 1400° C., which metastably contains excessive alumina, and the mixture of such mullite and the alumina separated from the mullite have a better sinterability than a stable mullite having the $Al_2O_3/SiO_2$ molar ratio of 3/2 and the simple mixture of mullite and alumina. The above mixed polycrystals of mullite and alumina hardly contains glass phase of silica, and even if it contains a small amount of glass phase, such glass phase reacts with the reactive alumina separated from the metastable mullite to form mullite, thus the glass phase may easily disappear.

Since the glass phase does not exist under the above circumstance and alumina disperses uniformly and finely, the grain growth is controlled and the fine uniform distribution of grains can be attained. Consequently, in the sintered body of the present invention, the content of grains having the longitudinal length of not less than 2.5 μm is 1% or less.

Further, if γ-phase or δ-phase alumina contained in the starting powdery material and the active alumina separated from the metastable mullite are not consumed in the reaction with silica, they transform into α-phase alumina during sintering.

Therefore, in the present invention, it is necessary to employ the starting powdery material which can form metastable mullite having the $Al_2O_3/SiO_2$ molar ratio of larger than that of the stable mullite during sintering. For this purpose, the starting powdery material should comprise from 75 wt % to 85 wt % $Al_2O_3$ balance silica and contain amorphous phase not less than 65 wt %. The content of amorphous phase should be not more than 90 wt %, since in the case excessive amorphous phase is present, glass phase easily remains, while the sinterability is good. Referring to the other crystalline phases, the content of mullite is preferably not more than 10 wt % because a large amount of mullite deteriorates the sinterability. It is desired that α-phase alumina is not detected, because the existence of α-phase alumina hinders the sintering and the reaction for forming mullite. It is desired that γ-phase or δ-phase alumina exists because they are highly reactive fine a aluminas, and that its content is preferably not less than 10 wt %. When the content of amorphous phase is 65 wt % and mullite or α-phase alumina is not detected, the maximum content of γ-phase or δ-phase alumina is 35 wt %. Therefore, the preferable content range of γ-phase or δ-phase alumina is from 10 to 35 wt %. That is, it is desired that the starting powdery material consists crystallographically of from 0 to 10 wt % mullite and from 10 to 35 wt % γ-phase or δ-phase alumina in addition to the amorphous phase.

Moreover, by employing the composite powder, each particle of which contains both $Al_2O_3$ and $SiO_2$, as the starting powdery material, the sinterability is more enhanced in comparison with the case employing the simple mixture of $Al_2O_3$ powder and $SiO_2$ powder.

Referring to the particle size or the surface area of such composite powder, the average particle diameter is desired to be from 30 to 100 nm and the specific surface area is desired to be from 20 to 70 m²/g. When the average particle diameter is smaller than 30 nm or the specific surface area is larger than 70 m²/g, the particles are too fine to treat and they easily form non-uniform sintered bodies. On the other hand, when the average particle diameter is larger than 100 nm or the specific surface area is smaller than 20 m²/g, the particles are so large that they have poor sinterability and that the reaction for forming mullite may be incomplete.

The above mentioned composite powder can be prepared by the following method for example.

$AlCl_3$ and $SiCl_4$ are used as the starting materials, and the gaseous mixture thereof or the mixed gas of such gaseous mixture and nitrogen is blown into a combustion gas, in which flame is generated by oxygen and hydrogen. The oxidation reaction in the high temperature vapor phase proceeds in the combustion gas. When the composite powder comprising $Al_2O_3$ and $SiO_2$ is formed by oxidation reaction in a high temperature vapor phase, the maximum temperature of the section where the reaction occurs is controlled in the range from 1800° C. to 2100° C., and after the reaction, the cooling rate between the temperature of 1500° C. and the temperature of 900° C. is controlled to be more than $5 \times 10^{3}$° C./sec. Thus the desirable powder can be obtained.

The reasons why the maximum temperature is controlled in the range from 1800° C. to 2100° C. at the section where the reaction occurs are that the siterability is lowered since excessive water or chlorides are contained in the powder at the temperature lower than 1800° C. and that the apparatus is easily damaged and the operation is difficult to carry out at the temperature of higher than 2100° C.

The reason why the cooling rate between 1500° C. and 900° C. is controlled to be more than $5 \times 10^{3}$° C./sec is that the sinterability of the composite powder is lowered due to the crystallization of mullite at the cooling rate of not more than $5 \times 10^{3}$° C./sec.

In the case of a rapid cooling such as the cooling rate exceeding $10^{7}$° C./sec, it is possible that alumina also changes into amorphous. If alumina changes to amorphous, the shaping density is lowered and non-uniform mass-transfer easily occurs during sintering. Then grains grow abnormally and glass phase remains. However, in the ordinary conditions, the rapid cooling exceeding $10^{7}$° C./sec is improbable.

When a sintered body is produced by employing the starting composite powdery material prepared by the above method, the sintering temperature is controlled in the range from 1500° C. to 1650° C. When the sintering temperature is lower than 1500° C., there is a possibility that the porosity of the sintered body is more than 1%, alumina dose not change completely into α-phase, and glass phase remains due to the incomplete reaction of alumina and amorphous silica. On the other hand, when the sintering temperature is higher than 1650° C., grains grow remarkably. The sintering period should be shorten in the relatively high temperature sintering, especially at the sintering temperature of higher than 1600° C., for example at 1650° C., the sintering period should be shorter than 1 hour, because grains grow remarkably by sintering for the period of longer than 1 hour. The more preferable range of sintering temperature is from 1500° C. to 1600° C.

The data showing the properties of the sintered body or the starting powdery material in the present invention are defined as follows:

The crystalline phases in the $Al_2O_3$-$SiO_2$ powdery material are determined quantitatively by a similar method to the X-ray diffractometory reported by Gani. et al. (J. Mater. Sci. 12 (1977) 999–1009).

The quantitative determination can be carried out in a following manner, for example.

First, powder consisting of 100% crystallized mullite is prepared and mixed with amorphous powder having the $Al_2O_3/SiO_2$ molar ratio of 3/2 in various ratios. (Such amorphous powder is prepared by for example heating a hydrolysis product of a metal alkoxide mixture at 900° C.) 10 parts by weight of silicon powder is added as a standard material to 100 parts by weight of the above mixture of the mullite powder and the amorphous powder, and X-ray diffractometry using Cu-Kα radiation is carried out. Then, the calibration curves are prepared by using the integrated intensities of the diffraction peaks of the silicon (111) and the diffraction peaks of the mullite (121). In a similar manner, a powder consisting of 100% crystalline γ-$Al_2O_3$ is mixed in various ratios with amorphous powder having the $Al_2O_3/SiO_2$ molar ratio of 3/2, silicon is added to the mixture thereof, X-ray diffractometry is carried out, and the calibration curves are prepared by using the integrated intensities of the diffraction peaks of the silicon (111) and the diffraction peaks of the γ-$Al_2O_3$ (440).

10 parts by weight of silicon powder is added to 100 parts by weight of the $Al_2O_3$-$SiO_2$ powdery specimen composed of amorphous phase, mullite phase and γ-$Al_2O_3$ phase. Mullite and γ-$Al_2O_3$ are quantitatively determined from the intensities of the diffraction peaks of the silicon (111), the diffraction peaks of the mullite (121) and the diffraction peaks of the γ-$Al_2O_3$ (440), on the basis of the above calibration curves.

If the content of mullite is too much, the quantitative determination of γ-$Al_2O_3$ is difficult, because of the overlap of the mullite diffraction peaks with the diffraction peaks of the γ-$Al_2O_3$ (440). However, there is no problem in this aspect, because the content of mullite in the starting powdery material of the present invention is not more than 10 wt %.

Further, if the crystalline structure of $Al_2O_3$ is δ-phase, as it is considered that δ-phase has the more orderly arranged crystalline structure than γ-phase and has substantially the same crystalline structure with γ-phase, δphase $Al_2O_3$ can be quantitatively determined by using the sum of intesities of the diffraction peaks of the δ-$Al_2O_3$ (440) and the δ-$Al_2O_3$ (4,0,12) corresponding to the diffraction peak of the γ-$Al_2O_3$ (440). The quantity of amorphous phase can be calculated by subtracting the sum of the percentages of the detected crystalline phases from 100.

The distinction between γ-$Al_2O_3$ and δ-$Al_2O_3$ was made by referring to Powder Diffrcation File No. 10-425 for γ-phase and No. 16-394 for δ-phase in JCPDS.

The lattice parameters of mullite crystalline phase formed during sintering can be obtained by the ordinary X-ray diffractometry. The sintered body is milled into powder and the standard material (for example silicon powder) is added to said powder for the X-ray diffractometry.

The lattice parameters can be determined from more than 8 diffraction peaks of the mullite by a computer calculation based on the least square method. The composition of mullite can be estimated from these lattice parameters using the relation between the mullite composition and the lattice parameters reported by Cameron (Ceram.Bull. 56 (1977) 1003).

The theoretical density of the sintered body was calculated by the following method.

It is considered that the sintered body of a stable single phase mullite can contain $Al_2O_3$ up to 74 wt %. The theoretical density of mullite containing 74 wt % $Al_2O_3$ can be calculated to be 3.154 g/cm$^3$ by using the above mentioned Cameron's data. When the content of $Al_2O_3$ is more than 74 wt %, it is considered that the sintered body is composed of two phases, 74 wt % mullite and balance $\alpha$-$Al_2O_3$. The theoretical density of the sintered body, in which the content of $Al_2O_3$ is A wt % ($A \geq 74$), is calculated as follows, assuming that the theoretical density of $\alpha$-$Al_2O_3$ is 3.987 g/cm$^3$. The content of $SiO_2$ contained in a sample of 100 g is (100−A)g, and since all the $SiO_2$ is consumed to form mullite (containing 74 wt % $Al_2O_3$), the content of mullite is $$(100 - A) \times \frac{100}{26} \text{ g}.$$

The content of $\alpha$-$Al_2O_3$, which is the remainder obtained by subtracting the content of mullite from the total, is calculated to be $$100 - (100 - A) \times \frac{100}{26} = (A - 74) \times \frac{100}{26} \text{ g}.$$

From these results, the volume of mullite and the volume of $\alpha$-$Al_2O_3$ are respectively, $$\frac{100(100 - A)}{26 \times 3.154} \text{ cm}^3 \text{ and } \frac{100(A - 74)}{26 \times 3.987} \text{ cm}^3.$$

Then, the theoretical density of the sintered body is obtained by the following equation. The theoretical density of the sintered body (g/cm$^3$)

$$= \frac{100}{\frac{100(100-A)}{26 \times 3.154} + \frac{100(100-74)}{26 \times 3.987}} = \frac{26}{\frac{100-A}{3.154} + \frac{A-74}{3.987}}$$

The relative density is calculated to be the result obtained by dividing the measured density of the sintered body by the theoretical density, and is expressed by percentage. The porosity is obtained by subtracting the relative density (%) from 100.

The average particle diameter of the grains in the sintered body can be obtained by for example an intercept method in the SEM observation of a cross section of the sintered body which is subjected to thermal etching after polishing.

In the experiments concerning the present invention, the shape of the grains was approximated as sphere and the average grain diameter was assumed to be 1.5 times as long as the average length of intercepts of arbitrary straight lines which were cut by grains.

The existence of the amorphous glass phase remaining in the sintered body can be inspected by dipping samples in hydrofluoric acid (HF) solution. In the experiments concerning the present invention, the weight loss was measured by dipping samples of 3 mm×3 mm×10 mm in a solution of 2 wt % hydrofluoric acid for 18 hours, and when the weight loss was not more than 0.05% which was in a range of allowable measuring error, it was judged that the glass phase did not exist.

The mullite-alumina composite sintered body according to the present invention is produced by sintering the starting powdery material, which is composed of from 75 wt % to 85 wt % $Al_2O_3$ balance $SiO_2$, has a alumina-rich composition than a stable mullite and contains amorphous phase from 65 wt % to 90 wt %, at a temperature from 1500° C. to 1650° C. By the direct crystallization from amorphous phase to mullite, metastable mullite crystalline phase containing $Al_2O_3$ in excess than a stable mullite, appears during sintering, and with the proceeding of sintering, the metastable mullite separates $Al_2O_3$ and transforms into a mullite of the stable state. Therefore, the mullite-alumina composite sintered body produced through the above process has a structure, in which fine grains of alumina and mullite are uniformly dispersed. Moreover, the fair sinterability can be attained due to a starting powdery material, each particle of which contains both of $Al_2O_3$ and $SiO_2$.

As the result, the sintered body does not contain glass phase, wherein both of the average diameters of mullite grains and $\alpha$-alumina grains are not more than 1.0$\mu$, the content of grains having the longitudinal-length of not less than 2.5 $\mu$m is 1% or less in the observation of a cross section of said sintered body, and the porosity of said sintered body is 1% or less. Then, the sintered body having a high room temperature bending strength can be obtained.

EXAMPLE 1

The $Al_2O_3$-$SiO_2$ starting powdery material for producing the sintered body according to the present invention was prepared by the process and the apparatus illustrated in FIG. 1

Anhydrous aluminum chloride ($AlCl_3$) and silicon tetrachloride ($SiCl_4$) were employed as the feedstocks. $AlCl_3$ is a solid at room temperature and has a sublimating point of about 180° C. A vaporizer 1 of fluidized bed type using $Al_2O_3$ particles as fluidized medium was employed. $AlCl_3$ was continuously or intermittently supplied from the upper part 2 of the vaporizer 1. The temperature of the vaporizer 1 was kept constant by using an electric furnace 3. The feeding rate of $AlCl_3$ vapor into a reactor was determined by a vapor pressure of $AlCl_3$ and a flow rate of nitrogen gas ($N_2$) which was a carrier gas of $AlCl_3$ and was blown in from the bottom 4 of the fluidized bed. The constant amount of $AlCl_3$ vapor was fed into the reactor.

Since $SiCl_4$ is liquid at room temperature, it was supplied from a $SiCl_4$ reservoir 5 at constant rate by pump 6. $SiCl_4$ was vaporized by vaporizer 7 which was kept at a temperature higher than a boiling point of $SiCl_4$ by for example a ribbon heater and mixed with $N_2$ which was a carrier gas of $SiCl_4$ and was blown through a gas inlet 8.

A mixture of $AlCl_3$ and the carrier gas $N_2$ and a mixture of $SiCl_4$ and the carrier gas $N_2$ were introduced into a mixing vessel 9 through tubes heated by some suitable heater such as a ribbon heater to the temperature of 360° C. which was high enough to prevent crystallization and/or condensation of $AlCl_3$ and $SiCl_4$. These gas mixture were mixed in the mixing vessel 9 and then blown into a mixing section 10 at the upper part of the reactor.

The feeding rates of $AlCl_3$ and $SiCl_4$ were 118 g/h and 34 g/h, respectively. The flow rates of the carrier gas $N_2$ were 0.48 $Nm^3/h$ for the $AlCl_3$ side and 0.12 $Nm^3/h$ for the $SiCl_4$ side.

Hydrogen ($H_2$) of 1.0 $Nm^3/h$ and oxygen ($O_2$) of 0.9 $Nm^3/h$ were also blown into the mixing section 10 through a gas inlet 11 and a gas inlet 12, respectively, to make a flame horizontally. The vapor mixture containing chlorides were blown vertically downward to the mixing section 10 through the nozzle, which was protected from the outside 13 by blowing an additional $N_2$ at the rate of 0.1 $Nm^3/h$. The temperature at the mixing section 10 of the reactor, into which the above gases were blown, was calculated to be 1970° C., under the consideration of a heat loss.

A contracted section 14 adjoined the exit of the mixing section 10 of the reactor. The section placed downstream from the contracted section 14 is referred to be a high temperature cooling section 15. The mixed gas and the product were cooled rapidly from the temperature of 1580° C. to the temperature of 850° C. in this high temperature cooling section 15. The gas retention time in this section 15 was calculated to be 62 msec(-milisecond). And the cooling rate was calculated to be $1.18 \times 10^{4}$°C./sec. If the rate of cooling from 1500° C. to 900° C. is not more than $5 \times 10^3$°C./sec, mullite can be crystallized from the high temperature amorphous state. The cooling rate between 1500° C. and 900° C. in this example could be estimated to be the same with the value of $1.18 \times 10^{4}$°C./sec, which was a sufficiently rapid cooling rate exceeding $5 \times 10^3$°C./sec.

The mixed gas and the product were cooled rapidly by nitrogen for cooling which was blown in through a gas inlet 16 at the lower part of the high temperature cooling section 15. The gas separated the solid product in a solid-vapor separation drum 17 and left the system through a gas outlet 18. After the experiment, the produced powder was recovered from the bottom 19 of the separation drum 17.

Figure 2:
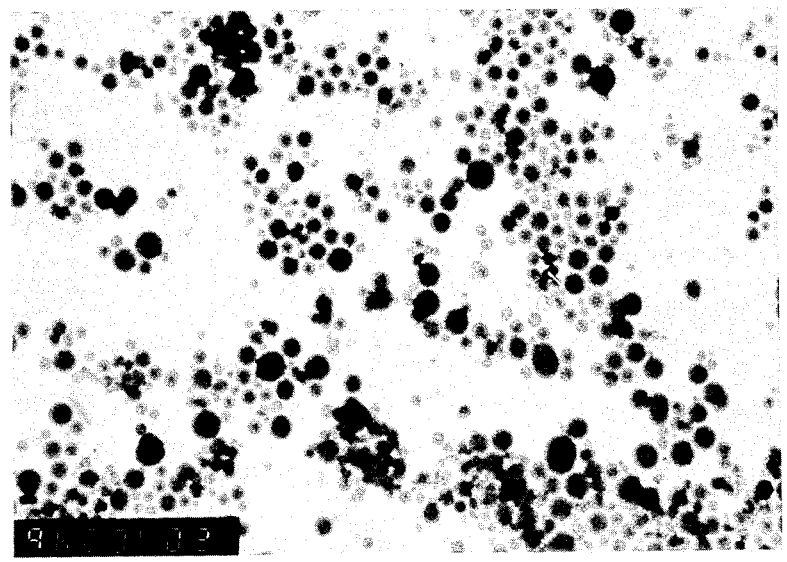
FIG. 2 is a transmission electron micrograph (magnification ×33,000) showing the particle morphology of the starting powdery material employed in Example 1.
Figure 3:
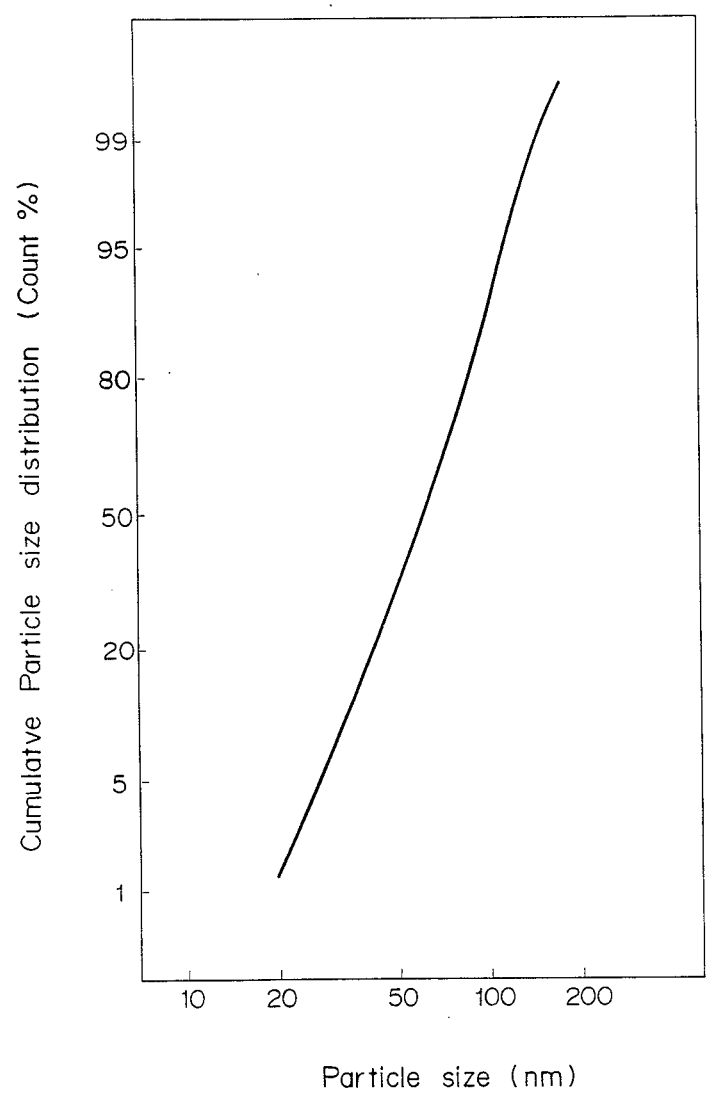
FIG. 3 is a graph illustrating the cumulative particle size distribution of the starting powdery material employed in Example 1.

The particle morphology of the produced powder was ultrafine and spherical as shown in the transmission electron micrograph (magnifcation ×33,000) of FIG. 2. The particle size distribution indicated a nearly straight line by plotting on the log-normal distribution probability graph, as shown in FIG. 3, and the median diameter was 65 nm. The specific surface area of this powder measured by the BET method was 39.6 $m^2/g$.

In the X-ray diffraction pattern, amorphous phase, mullite and $\gamma$-$Al_2O_3$ were detected, but $\alpha$-$Al_2O_3$ was not detected. From the result of the quantitative determination of crystalline phases, the content of mullite was 6 wt % and the content of $\gamma$-$Al_2O_3$ was 18 wt %. The content of the amorphous phase was calculated to be the balance, 76 wt %. From the result of the chemical analysis, the content of $Al_2O_3$ was 79.5 wt % and the balance was the content of $SiO_2$.

An organic material was added to the powder, and the mixture was granulated, shaped under a pressure of 3 ton/$cm^2$ by the isotactic press (CIP) method and sintered at 1600° C. for 2 hours. Then, the sintered density of 3.294 g/$cm^3$ (the relative density of 99.8%) was achieved. That is, the porosity was 0.2%. The room temperature bending strength of the sintered body was 533±28 MPa (54.5±2.9 kg/$mm^2$).

Figure 4:
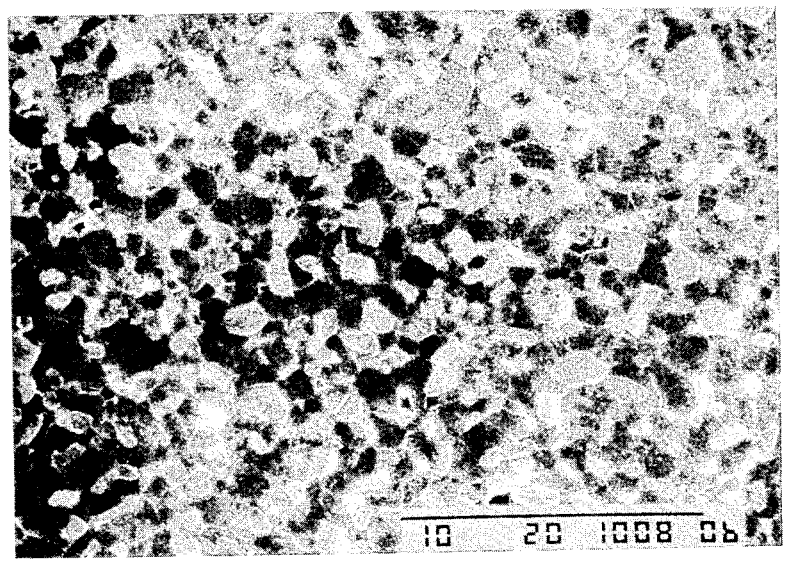
FIG. 4 is a scanning electron micrograph (magnification ×5000) showing the grain structure in a cross section of the sintered body obtained in Example 1.

The polished surface of a cross section of the sintered body was subjected to a thermal etching. In the observation of the grain structure of the sintered body by the scanning electron microscopy (magnification ×5000), the microstructure shown in FIG. 4 was found. In FIG. 4, corundum grains appear white and mullite grains dark. Both of alumina grains and mullite grains were small and isotropic. The grains having the longitudinal-length of more than 2.5 $\mu$m were hardly observed in the cross section and the content of them was less than 1%. The average diameters of alumina and mullite determined by the intercept method were 0.77 $\mu$m and 0.85 $\mu$m respectively, which were smaller than 1.0 $\mu$m. The sample was cut into a 3 mm×3 mm×10 mm bar and dipped in an aqueous solution of hydrofluoric acid for 18 hours, but the weight loss was not detected.

On the other hand, the same shaped sample was sintered at 1000° C. for 2 hours, milled and examined by X-ray diffractometry. The lattice parameter $a_0$ of mullite was 0.7617±0.0003 nm.

From Cameron's data, the $Al_2O_3/SiO_2$ molar ratio of this mullite was about 73/27, which contained $Al_2O_3$ in excess than the stable mullite. The above sift in the lattice parameter was not found with respect to the sintered body produced by sintering at 1400° C. for 2 hours.

The sintered body according to the present invention has a higher strength than the mullite or mullite-alumina sintered bodies previously reported, and in spite of pressureless sintering, the value of its bending strength exceeds the known highest value of those produced by hot pressing.

If the starting powdery material in this example is hotpressed, the higher density and the finer grain sizes can be expected. The strength also will be higher. Moreover, it is possible that the sintering temperature is lowered by about 50° C. to 100° C.

EXAMPLE 2

The powdery material composed of 82.8 wt % $Al_2O_3$ and 17.2 wt % $SiO_2$ was prepared by using the same apparatus as in Example 1, and feeding a larger amount of $Al_2O_3$ and a smaller amount of $SiO_2$ than those in Example 1. The other preparing conditions were the same as in Example 1.

From the result of quantitative determination of crystalline phases, the content of mullite was not more than 3 wt %, the content of $Al_2O_3$ which appeared to be $\gamma$-phase or $\delta$-phase was 28 wt %, and it is considered that the balance, from 69 to 72 wt %, was amorphous phase.

This powdery material was shaped in the same manner as in Example 1 and sintered at 1600° C. for 4 hours. Then, the densification up to the relative density of 99.4% (the porosity of 0.6%) and the room temperature bending strength of 527±71 MPa (53.8±7.2 kg/$mm^2$) could be achieved.

The grain diameters of $\alpha$-alumina and mullite in the sintered body were 0.92 $\mu$m and 0.83 $\mu$m respectively, and the grains were fine and isotropic. In the observation of a cross section, the grains having the longitudinal-length of not less than 2.5 $\mu$m were hardly found and the content of such grains was less than 1%. Further, the weight loss by a hydrofluoric acid treatment was not detected. The lattice parameter $a_0$ of mullite in the sample produced by sintering at 1000° C. for 2 hours was 0.7626±0.0002 nm. It seems that the mullite having the $Al_2O_3/SiO_2$ molar ratio of about 74:26 appeared during sintering.

EXAMPLE 3

The powder prepared in Example 1 was employed as a starting material and was sintered at 1550° C. for 8 hours. The other conditions were the same as in Example 1. The relative density of 99.1% and the room temperature bending strength of 510±48 MPa (52.0±4.9 kg/mm$^2$) were achieved.

The average grain diameters of α-alumina and mullite in the sintered body were 0.83 μm and 0.82 μm respectively. In the observation of a cross section, the grains having the longitudinal-length of not less than 2.5 μm were not found. The weight loss by hydrofluoric acid treatment was not detected.

EXAMPLE 4

The powder prepared in Example 2 was sintered at 1650° C. for 30 minutes. The relative density of 99.7% and the room temperature bending strength of 518±15 MPa (52.9±1.5 kg/mm$^2$) were achieved.

The average grain diameters of α-alumina and mullite in the sintered body were 0.87 μm and 0.80 μm respectively. In the observation of a cross section, the grains having the longitudinal-length of not less than 2.5 μm were not found. The weight loss by hydrofluoric acid treatment was not detected.

(EFFECT OF THE INVENTION)

In the mullite-alumina composite sintered body according to the present invention, the room temperature bending strength of the mullite-containing $Al_2O_3$-$SiO_2$ sintered bodies, which has not been satisfactory previously, has been significantly improved. The present invention is epoch-making because the achieved value of the strength exceeds not only the highest value 45 kg/mm$^2$ (441 MPa) of the sintered body produced previously by pressureless sintering but also the highest value 51 kg/mm$^2$ (500 MPa) of the sintered body produced previously by hot pressing.

Further, in the production of high performance mullite sintered bodies reported hitherto, the starting powdery material has been prepared by calcining a mixture or a composite of $Al_2O_3$ and $SiO_2$ at a high temperature to mullitize and then by grinding it. On the contary, the preparation method in the present invention does not involve the processes of calcination and grinding and it is economical by that degree.

What is claimed is:

1. A mullite-alumina composite sintered body comprising 77 to 85 wt % $Al_2O_3$, the balance being $SiO_2$, the sintered body having two crystalline phases of mullite and α-phase alumina and being free from any glass phase,
   the average diameters of mullite grains and α-phase alumina grains being not more than 1.0 μm,
   the content of grains having a longitudinal length of not less than 2.5 μm being 1% or less upon observation of a crosssection of the sintered body, and
   the porosity of the sintered body being 1% or less.

2. The mullite-alumina composite sintered body of claim 1 consisting essentially of 77 to 85 wt % $Al_2O_3$, the balance being $SiO_2$.

3. A process for producing a mullite-alumina composite sintered body, comprising
   preparing a starting powdery material comprising 77 to 85 wt % $Al_2O_3$, the balance being $SiO_2$, the powdery material containing 65 to 90 wt % amorphous phase and each particle thereof containing both $Al_2O_3$ and $SiO_2$; and
   sintering the starting powdery material at a temperature of 1500° C. to 1650° C.

4. The process for producing a mullite-alumina composite sintered body of claim 3, where the starting powdery material further comprises crystallographically
   0 to 10 wt % mullite; and
   10 to 35 wt % gamma-phase or delta-phase alumina, in addition to the amorphous phase.

5. The process for producing a mullite-alumina composite sintered body of claim 3, wherein
   the starting powdery material comprises spherical particles having the average particle diameter of 30 to 100 nm and a specific surface area of 20 to 70 m$^2$/g.

6. The process for producing a mullite-alumina composite sintered body of claim 3, further comprising producing the starting powdery material by
   blowing a vapor mixture of $AlCl_3$ and $SiCl_4$ into a combustion gas;
   oxidizing the vapor mixture in a high temperature vapor phase; and
   cooling the starting powdery material from 1500° C. to 900° C. at a cooling rate exceeding 5×10$^3$°C./sec.

7. The process for producing a mullite-alumina composite sintered body of claim 6, wherein
   the vapor phase oxidation of the mixture is conducted at a maximum temperature of 1800° C. to 2100° C.

* * * * *